US012052213B2

(12) United States Patent
Ghosh et al.

(10) Patent No.: US 12,052,213 B2
(45) Date of Patent: Jul. 30, 2024

(54) METHOD FOR INSTANT MESSAGING/ALERT TO MULTIPLE HOME DEVICES

(71) Applicant: ARRIS Enterprises LLC, Suwanee, GA (US)

(72) Inventors: Rajat Ghosh, Bangalore (IN); Aniket Salunkhe, Thane (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 146 days.

(21) Appl. No.: 17/716,203

(22) Filed: Apr. 8, 2022

(65) Prior Publication Data

US 2022/0417196 A1   Dec. 29, 2022

Related U.S. Application Data

(60) Provisional application No. 63/216,064, filed on Jun. 29, 2021.

(51) Int. Cl.
*G06F 15/16* (2006.01)
*H04L 51/224* (2022.01)

(52) U.S. Cl.
CPC .................. *H04L 51/224* (2022.05)

(58) Field of Classification Search
CPC ............ H04L 51/224; H04L 51/04
See application file for complete search history.

(56) References Cited

U.S. PATENT DOCUMENTS

| | | | |
|---|---|---|---|
| 2007/0202884 A1* | 8/2007 | Nykanen | H04L 67/147 455/455 |
| 2009/0103689 A1* | 4/2009 | Katis | H04L 65/1083 379/88.13 |
| 2015/0281457 A1* | 10/2015 | Albert | H04M 3/53366 379/88.22 |

* cited by examiner

*Primary Examiner* — John B Walsh
(74) *Attorney, Agent, or Firm* — Wenderoth, Lind & Ponack, L.L.P.

(57) ABSTRACT

A server device for use with a first and second user, a first and second client device respectively, a media device, the first client device configured to communicate with the second client device, one of the first or second client devices being configured to transmit an alert based on a failed attempt to initiate communication between the first client device and the second client device, the media device being configured to provide media to the user, the server device including: a memory; and a processor which executes instructions stored on the memory to cause the server device to: create a channel for the media device; associate, with the channel, one of the first or second client device; receive the alert; identify the media device based on the alert; and transmit a notification instruction to the media device to instruct the media device to provide a notification to the second user.

15 Claims, 5 Drawing Sheets

METHOD FOR INSTANT MESSAGING/ALERT TO MULTIPLE HOME DEVICES

BACKGROUND

Embodiments of the invention relate to instant messaging.

SUMMARY

Aspects of the present disclosure are drawn to a server device for use with a first user, a first client device, a second user, a second client device, and a media device, the first client device being associated with the first user and being configured to attempt to initiate communication with the second client device, one of the first client device and the second client device being configured to transmit an alert based a failed attempt to initiate communication between the first client device and the second client device, the second client device being associated with the second user, the media device being configured to provide media to the user. The server device includes: a memory having a data structure and instructions stored therein; and a processor configured to execute the instructions stored on the memory to cause the server device to: create a channel for the media device; associate, with the channel, the one of the first client device and the second client device configured to transmit the alert; receive the alert; identify the media device based on the alert; and transmit, based on the alert, a notification instruction to the media device to instruct the media device to provide a notification to the second user of the failed attempt to initiate communication.

In some embodiments, the first client device is configured to transmit the alert, and the processor is further configured to execute the instructions stored on the memory to additionally cause the server device to receive the alert from the first client device.

In some embodiments, the second client device is configured to transmit the alert, and the processor is further configured to execute the instructions stored on the memory to additionally cause the server device to receive the alert from the second client device.

In some embodiments, the processor is further configured to execute the instructions stored on the memory to additionally cause the server device to receive the alert as a real time communication protocol.

In some further embodiments, the server device is further used with a third user and a third client device, wherein one of the third client device and the second client device is configured to transmit a second alert based on a second failed attempt to initiate communication between the third client device and the second client device, the third client device being associated with the third user, wherein the processor is further configured to execute the instructions stored on the memory to additionally cause the server device to create a second channel for the media device; associate, with the second channel, one of the third client device and the second client device configured to transmit the second alert; receive the second alert; identify the media device based on the second alert; and transmit, based on the alert, a second notification instruction to the media device to instruct the media device to provide a second notification to the second user of the second failed attempt to initiate communication.

Other aspects of the present disclosure are drawn to a method of using a server device with a first user, a first client device, a second user, a second client device, and a media device, the first client device being associated with the first user and being configured to attempt to initiate communication with the second client device, one of the first client device and the second client device being configured to transmit an alert based a failed attempt to initiate communication between the first client device and the second client device, the second client device being associated with the second user, the media device being configured to provide media to the user. The method includes: creating, via a processor and into a memory having a data structure and instructions therein, a channel for the media device; associating, via the processor, the one of the first client device and the second client device configured to transmit the alert; receiving, via the processor, the alert; identifying, via the processor, the media device based on the alert; and transmitting, via the processor and based on the alert, a notification instruction to the media device to instruct the media device to provide a notification to the second user of the failed attempt to initiate communication.

In some embodiments, the first client device is configured to transmit the alert, further including, receiving, via the processor, the alert from the first client device.

In some embodiments, the second client device is configured to transmit the alert, further including, receiving, via the processor, the alert from the second client device.

In some embodiments, receiving, via the processor, the alert includes receiving the alert as a real-time communication protocol.

In some embodiments, the server device is further used with a third user and a third client device, wherein one of the third client device and the second client device is configured to transmit a second alert based on a second failed attempt to initiate communication between the third client device and the second client device, the third client device being associated with the third user, the method further including: creating, via the processor, a second channel for the media device; associating, via the processor and with the second channel, the one of the third client device and the second client device configured to transmit the second alert; receiving, via the processor, the second alert; identifying, via the processor, the media device based on the second alert; and transmitting, via the processor and based on the alert, a second notification instruction to the media device to instruct the media device to provide a second notification to the second user of the second failed attempt to initiate communication.

Other aspects of the present disclosure are drawn to a non-transitory, computer-readable media having computer-readable instructions stored thereon, the computer-readable instructions being capable of being read by a server device for use with a first user, a first client device, a second user, a second client device, and a media device, the first client device being associated with the first user and being configured to attempt to initiate communication with the second client device, one of the first client device and the second client device being configured to transmit an alert based a failed attempt to initiate communication between the first client device and the second client device, the second client device being associated with the second user, the media device being configured to provide media to the user, wherein the computer-readable instructions are capable of instructing the server device to perform the method including: creating, via a processor and into a memory having a data structure and instructions therein, a channel for the media device; associating, via the processor, the one of the first client device and the second client device configured to transmit the alert; receiving, via the processor, the alert;

identifying, via the processor, the media device based on the alert; and transmitting, via the processor and based on the alert, a notification instruction to the media device to instruct the media device to provide a notification to the second user of the failed attempt to initiate communication.

In some embodiments, the computer-readable instructions are capable of instructing the server device to perform the method wherein the first client device is configured to transmit the alert, further including, receiving, via the processor, the alert from the first client device.

In some embodiments the computer-readable instructions are capable of instructing the server device to perform the method wherein the second client device is configured to transmit the alert, further including, receiving, via the processor, the alert from the second client device.

In some embodiments, the computer-readable instructions are capable of instructing the server device to perform the method wherein the receiving, via the processor, the alert includes receiving the alert as a real time communication protocol.

In some embodiments, the server device is further used with a third user and a third client device, wherein one of the third client device and the second client device is configured to transmit a second alert based a second failed attempt to initiate communication between the third client device and the second client device, the third client device being associated with the third user, wherein the computer-readable instructions are capable of instructing the server device to perform the method further including: creating, via the processor, a second channel for the media device; associating, via the processor and with the second channel, the one of the third client device and the second client device configured to transmit the second alert; receiving, via the processor, the second alert; identifying, via the processor, the media device based on the second alert; and transmitting, via the processor and based on the alert, a second notification instruction to the media device to instruct the media device to provide a second notification to the second user of the second failed attempt to initiate communication.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Sometimes, cell phone and mobile device owners will miss phone calls or messages when they are preoccupied. In particular, elderly people or children are most susceptible to not paying attention to their mobile devices if they are not directly using them. This is especially true when they are watching television, playing video games, or using another media device with a display screen. Missing a phone call or message can be problematic when the incoming phone call or message is urgent. As such, there needs to be a way to immediately get the attention of a user after the failed communication attempt to ensure that the incoming phone call or message is received.

What is needed is a system and method for notifying a user of a missed message from an outside user.

A system and method in accordance with the present disclosure notifies a user of a missed message from an outside user.

In accordance with the present disclosure, a user may register a media device and a client device with a real-time communication (RTC) server. A second user may register with the media device using a second client device, creating a channel with the second client device and the media device. If the second user attempts to initiate contact with the first user but fails, the second client device may automatically send a failed notification alert to the RTC server by way of a known real-time communication protocol. Real-time communication may be any mode of telecommunication in which information is instantly transmitted without delays. The RTC server may analyze the failed notification alert and relay it to the corresponding media device. The media device may analyze the failed notification alert and display it on its connected display device. In some embodiments, once the second user attempts to initiate contact with the first user but fails, the first user's client device may send the failed notification alert to the RTC server.

An example system and method for notifying a user of a missed message from an outside user in accordance with aspects of the present disclosure will now be described in greater detail with reference to FIGS. 1-5.

Figure 1:
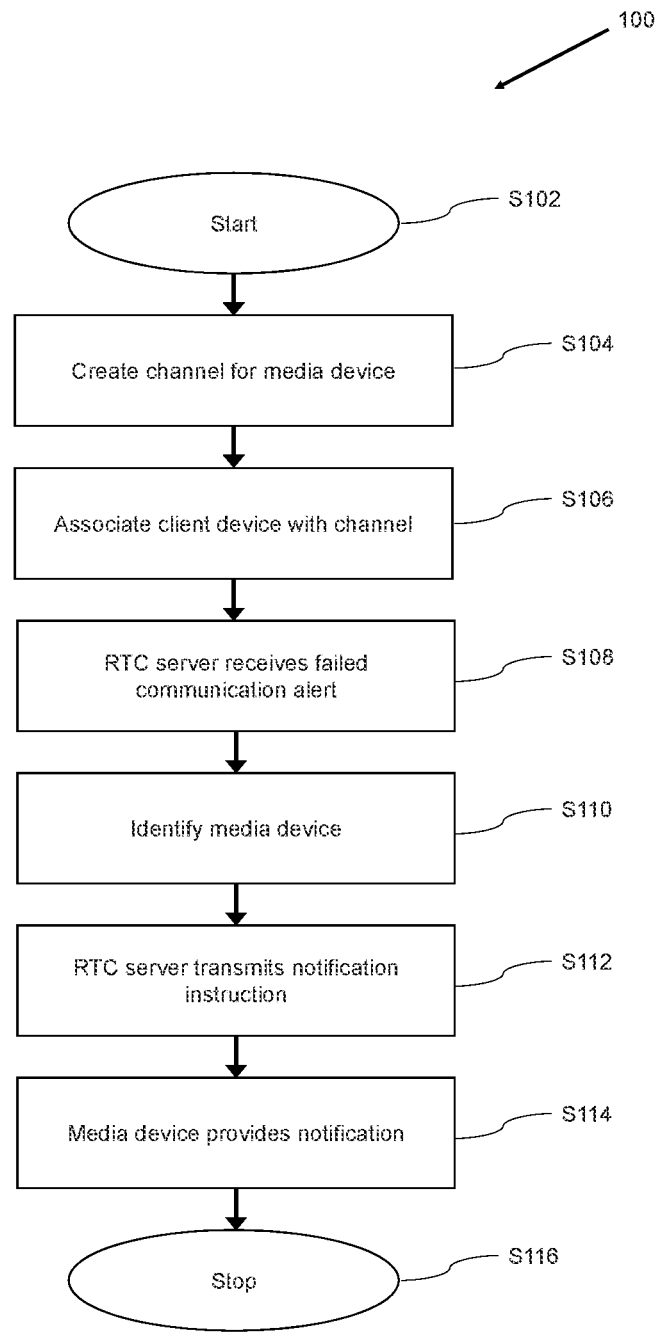
FIG. 1 illustrates a method of alerting a media device of a failed attempt to initiate communication in accordance with aspects of the present disclosure.

FIG. 1 illustrates an algorithm 100 to be executed by a processor for alerting a media device of a failed attempt to initiate communication in accordance with aspects of the present disclosure.

As shown in FIG. 1, algorithm 100 starts (S102), and a channel for the media device is created (S104). This will be described in greater detail with reference to FIG. 2.

Figure 2:
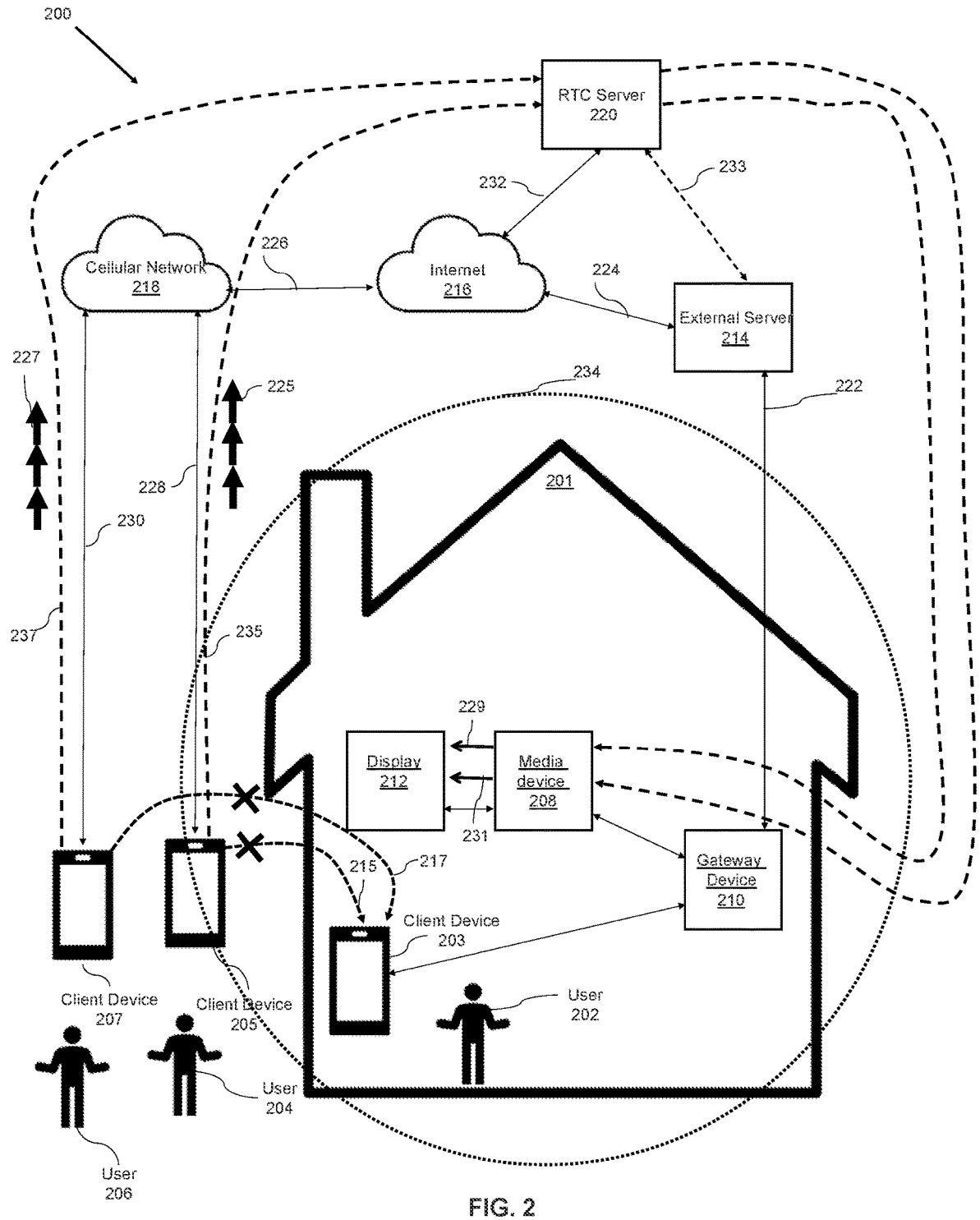
FIG. 2 illustrates a communication network in accordance with aspects of the present disclosure.

FIG. 2 illustrates a communication network 200 in accordance with aspects of the present disclosure.

As shown in FIG. 2, communication network 200 includes a residence 201, a user 202, a client device 203, a user 204, a client device 205, a user 206, a client device 207, a media device 208, a gateway device 210, a display 212, an external server 214, an internet 216, failed attempts to initiate communication 215 and 217, a cellular network 218, a RTC server 220, communication channels 222, 224, 226, 228, 230, and 232, a WLAN 234, failed communication alerts 225 and 227, notifications 229 and 231, and notification alert channels 235 and 237.

Gateway device 210, also referred to as a gateway, residential gateway, or RG, is an electronic device that is to be located so as to establish a local area network (LAN) at a consumer premises. The consumer premises can include a residential dwelling, office, or any other business space of a user, such as residence 201. The terms home, office, and premises may be used synonymously herein.

Gateway device 210 may be any device or system that is configured to allow data to flow from one discrete network to another, which in this example is from WLAN 234 to external server 214. Gateway device 210 may perform such functions as web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Gateway device 210 establishes, or is part of, WLAN 234, using Wi-Fi for example, such that client device 203, media device 208, and display 212 are able to communicate wirelessly with gateway device 210. In particular, gateway device 210 is able to communicate wirelessly directly with client device 203. The term Wi-Fi as used herein may be considered to refer to any of Wi-Fi 4, 5, 6, 6E, or any variation thereof.

Further, it should be noted that gateway device 210 is able to communicate with external server 214 via communication channel 222, which may optionally be a wireless communication system, such as 4G, or 5G, and further is able to connect to internet 216.

Gateway device 210 serves as a gateway or access point to internet 216 for one or more electronic devices, referred to generally herein as client device 203, that wirelessly communicate with gateway device 210 via, e.g., Wi-Fi. Client device 203 can be a desk top computer, laptop computer, electronic tablet device, smart phone, appliance, or any other so called internet of things equipped devices that are equipped to communicate information via WLAN 234.

A wireless access point (WAP), or more generally just access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In WLAN 234, gateway device 210, is an access point for WLAN 234.

Media device 208 is connected to both display 212 and gateway device 210. A non-limiting example of a media device 208 is a set-top box, and a non-limiting example of display 212 is a television. Media device 208 is able to play media, which is then displayed on display 212 to user 202. Further, media device 208 is capable of streaming data via external server 214.

User 202 is associated with client device 203, user 204 is associated with client device 205, and user 206 is associated with client device 207.

For example, with reference to FIG. 2, gateway device 210 is associated with both media device 208 and client device 203. User 202 may use client device 203 to register media device 208 with RTC server 220 as a subscriber. As a subscriber, media device 208 may receive notification instructions from RTC server 220. RTC server 220 may then create notification alert channel 235 for media device 208. This may allow RTC server 220 to upload notification instructions to media device 208 through internet 216, external server 214 and gateway device 210. An outside party may be able to register with notification alert channel 235.

In some embodiments, external server 214 and RTC server 220 may be a unitary device, in which gateway device 210 is directly connected.

Returning to FIG. 1, after a channel for the media device is created (S104), the client device is associated with the channel (S106). For example, returning to FIG. 2, user 204 may user client device 205 to register with RTC server 220 as a publisher to media device 208. As a publisher, client device 205 may automatically send notification instructions to RTC server 220 when there is a failed attempt to initiate communication with client device 203 through notification alert channel 235.

In some embodiments, as shown in FIG. 2, there may be more than one publisher registered to a subscriber. Both client device 205, associated with user 204, and client device 207, associated with user 206, are associated with media device 208 through notification alert channels 235 and 237 respectively.

Returning to FIG. 1, after the client device is associated with the channel (S106), the RTC server receives a failed communication alert (S108). This will be described in greater detail with reference to FIG. 3.

Figure 3:
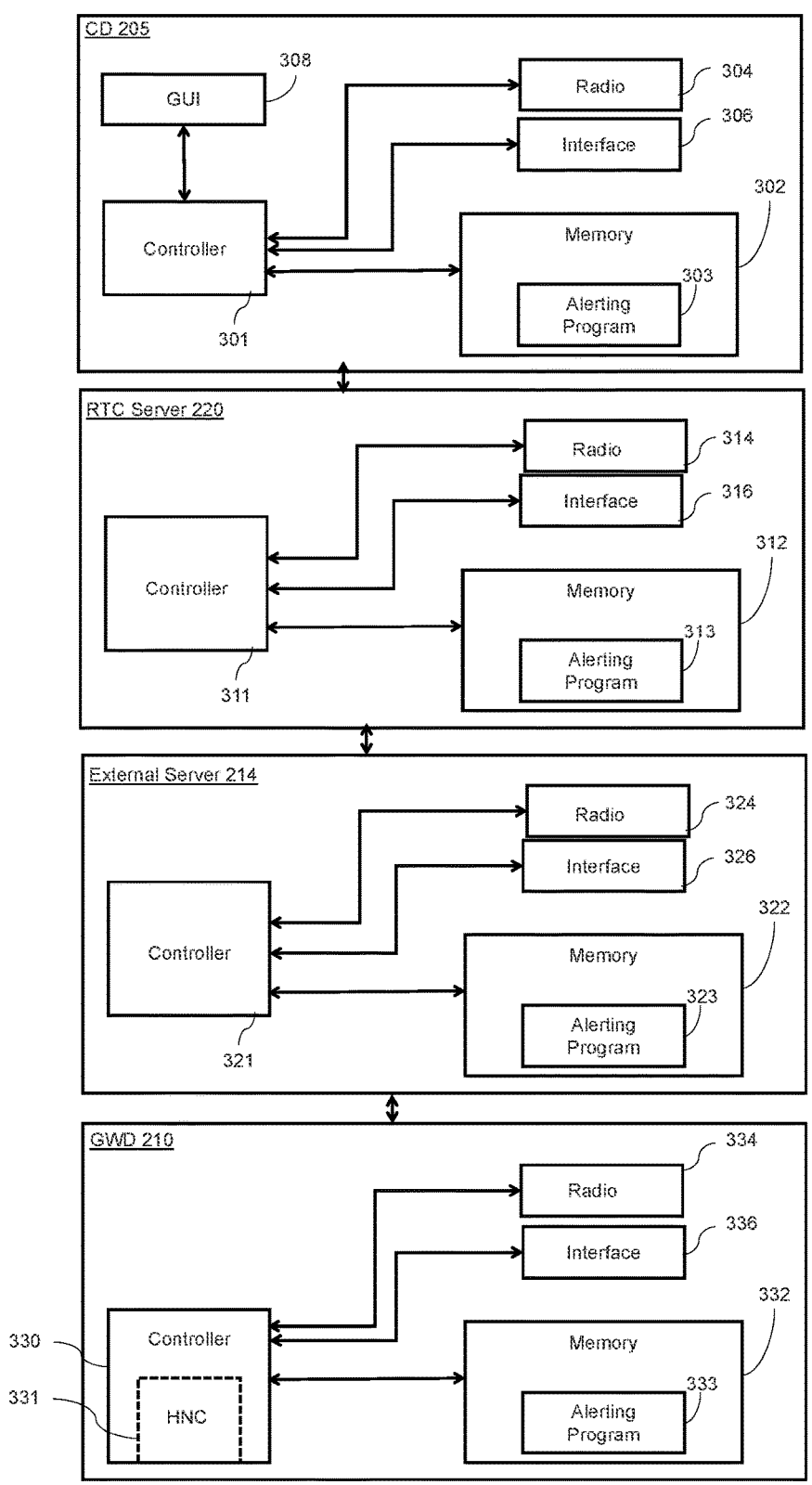
FIG. 3 illustrates an exploded view of a client device, a real-time communication (RTC) server, an external server, and a gateway device in accordance with aspects of the present disclosure.

FIG. 3 illustrates an exploded view of client device 205, RTC server 220, external server 214, and gateway device 210 in accordance with aspects of the present disclosure.

As shown in FIG. 3, client device 205 includes: a controller 301; a memory 302, which has stored therein an alerting program 303; and at least one radio, a sample of which is illustrated as a radio 304; an interface 306; and a graphic user interface (GUI) 308.

In this example, controller 301, memory 302, radio 304, interface 306 and GUI 308 are illustrated as individual devices. However, in some embodiments, at least two of controller 301, memory 302, radio 304, interface 306 and GUI 308 may be combined as a unitary device. Further, in some embodiments, at least one of controller 301 and memory 302 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 301 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 205 in accordance with the embodiments described in the present disclosure.

Memory 302 can store various programming, and user content, and data.

Alerting program 303 includes instructions to enable client device 205 to send alerts to RTC server 220.

Radio 304, may include a Wi-Fi WLAN interface radio transceiver that is configured to communicate with media device 208 and with gateway device 210, as shown in FIG. 2 and also may include a cellular transceiver configured to communicate with cellular network 218. Radio 304 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Client device 205 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

Interface 306 can include one or more connectors, such as RF connectors, or Ethernet connectors, and/or wireless communication circuitry, such as 5G circuitry and one or more antennas.

GUI 308 may be any known device or system to display an interactive image to user 204 to enable user 204 to interact with client device 205.

Any of the client devices within WLAN 234 may be a client device similar to client device 205. In the event that a client device within WLAN 234 is not a mobile device similar to client device 205, such a client device may still include: a controller, which can include a dedicated hardware circuitry such as a dedicated control circuit, CPU, microprocessor, etc., and that controls the circuits of the client device; a memory, which has stored therein an alerting program, that is similar to memory 302 and alerting program 303, respectively, of client device 205 discussed above; a radio similar to radio 304 of client device 205 discussed above; in additional to further functional circuitry. Accordingly, any of the client devices may include a Wi-Fi WLAN interface radio transceiver, that is configured to communicate with other client devices and with gateway device 210, as shown in FIG. 2 and also may include a cellular transceiver configured to communicate with cellular network 218. Further, any of the client devices may include a radio that is similar to radio 304 of client device 205 discussed above. Still further, any of the client devices may be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol, in a manner similar to client device 205 discussed above.

As shown in FIG. 3, RTC server 220 includes: a controller 311; a memory 312, which has stored therein an alerting program 313; and at least one radio, a sample of which is illustrated as a radio 314; and an interface 316.

In this example, controller 311, memory 312, radio 314, and interface 316 are illustrated as individual devices. However, in some embodiments, at least two of controller 311, memory 312, radio 314, and interface 316 may be combined as a unitary device. Further, in some embodiments, at least one of controller 311 and memory 312 may be implemented as a computer having tangible computer-readable media for carrying or having computer-executable instructions or data structures stored thereon.

Controller 311 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of RTC server 220 in accordance with the embodiments described in the present disclosure.

RTC server 220 is configured for use with user 202 and client device 203, wherein one of client device 205 and client device 203 is configured to transmit a failed communication alert based on a failed attempt to initiate communication between client device 205 and client device 203, and wherein client device 205 is associated with the user 204. Memory 312, as will be described in greater detail below, has instructions stored thereon to be executed by controller 311 to cause RTC server 220 to: create a channel for media device 208; associate, with the channel, one of client device 203 and 205 being configured to transmit the failed communication alert; receive the failed communication alert; identify media device 208 based on the failed communication alert; and transmit, based on the failed communication alert, a notification instruction to media device 208 to instruct media device 208 to provide a notification to the second user of the failed attempt to initiate communication.

In some embodiments, as will be described in greater detail below, client device 205 is configured to transmit the failed communication alert. In some of these embodiments, as will be described in greater detail below, memory 312 has instructions stored thereon to be executed by controller 311 to cause RTC server 220 to receive a failed communication alert from client device 205.

In some embodiments, as will be described in greater detail below, client device 203 is configured to transmit the failed communication alert. In some of these embodiments, as will be described in greater detail below, memory 312 has instructions stored thereon to be executed by controller 311 to cause RTC server 220 to receive a failed communication alert from client device 203.

In some embodiments, as will be described in greater detail below, controller 311 is further configured to execute the instructions stored on memory 312 to additionally cause RTC server 220 to receive the failed communication alert as a real-time communication protocol.

In some further embodiments, as will be described in greater detail below, RTC server 220 is configured for further use with user 206 and client device 207, wherein one of client device 207 and client device 205 is configured to transmit a second failed communication alert based a second failed attempt to initiate communication between client device 207 and client device 203 and wherein client device 207 is associated with user 206. In these embodiments, memory 312, as will be described in greater detail below, has instructions stored thereon to be executed by controller 311 to cause RTC server 220 to: create a channel for media device 208; associate, with the second channel, one of client device 207 and 205 being configured to transmit the failed communication alert; receive the second failed communication alert; identify media device 208 based on the second failed communication alert; and transmit, based on the second failed communication alert, a second notification instruction to media device 208 to instruct media device 208 to provide a second notification to user 202 of the failed attempt to initiate communication.

Alerting program 313 includes instructions to enable RTC server 220 to send failed communication alerts to external server 214.

Radio 314, may include a Wi-Fi WLAN interface radio transceiver that is configured to communicate with external server 214, as shown in FIG. 2. Radio 314 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Radio 314 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

Interface 316 can include one or more connectors, such as RF connectors, or Ethernet connectors, and/or wireless communication circuitry, such as 5G circuitry and one or more antennas. Interface 316 receives data from gateway device 210 through external server 214 (as shown in FIG. 2) by known methods, non-limiting examples of which include terrestrial antenna, satellite dish, wired cable, DSL, optical fibers, or 5G as discussed above.

As shown in FIG. 3, external server 214 includes: a controller 321; a memory 322, which has stored therein an alerting program 323; and at least one radio, a sample of which is illustrated as a radio 324; and an interface 326.

In this example, controller 321, memory 322, radio 324, and interface 326 are illustrated as individual devices. However, in some embodiments, at least two of controller 321, memory 322, radio 324, and interface 326 may be combined as a unitary device. Further, in some embodiments, at least one of controller 321 and memory 322 may be implemented as a computer having tangible computer-readable media for carrying or having computer-executable instructions or data structures stored thereon.

Controller 321 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of external server 214 in accordance with the embodiments described in the present disclosure.

Memory 322 can store various programming, and user content, and data.

Alerting program 323 includes instructions to enable external server 214 to send failed communication alerts to gateway device 210.

Radio 324, may include a Wi-Fi WLAN interface radio transceiver that is configured to communicate with gateway device 210, as shown in FIG. 2. Radio 324 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Radio 324 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

Interface 326 can include one or more connectors, such as RF connectors, or Ethernet connectors, and/or wireless communication circuitry, such as 5G circuitry and one or more antennas. Interface 326 receives data from gateway device 210 (as shown in FIG. 2) by known methods, non-limiting examples of which include terrestrial antenna, satellite dish, wired cable, DSL, optical fibers, or 5G as discussed above. Through interface 326, external server 214 receives an input signal, including data and/or audio/video content, from gateway device 210 and can send data to gateway device 210.

As shown in FIG. 3, gateway device 210 includes: a controller 330, which has stored therein a home network controller (HNC) 331; a memory 332, which has stored therein an alerting program 333; a radio 334; and an interface 336.

In this example, controller 330, memory 332, radio 334, and interface 336 are illustrated as individual devices. However, in some embodiments, at least two of controller 330, memory 332, radio 334, and interface 336 may be combined as a unitary device. Whether as individual devices or as combined devices, controller 330, memory 332, radio 334, and interface 336 may be implemented as any combination of an apparatus, a system and an integrated circuit. Further, in some embodiments, at least one of controller 330, memory 332, and interface 336 may be implemented as a computer having non-transitory computer-readable media for carrying or having computer-executable instructions or data structures stored thereon.

Controller 330 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 210 in accordance with the embodiments described in the present disclosure.

HNC 331 controls gateway device 210 within the wireless network. HNC 331 may perform tasks such as steering connected devices, a non-limiting example of which is a smart television, from one access point to another.

Memory 332 can store various programming, and user content, and data.

Alerting program 333 includes instructions to enable gateway device 210 to send notification instructions based on failed communication alerts to media device 208.

Radio 334 may also be referred to as a wireless communication circuit, such as a Wi-Fi WLAN interface radio transceiver and is configured to communicate with media device 208, client device 203, and external server 214. Radio 334 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Gateway device 210 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands, RF4CE protocol, ZigBee protocol, Z-Wave protocol, or IEEE 802.15.4 protocol.

Interface 336 can include one or more connectors, such as RF connectors, or Ethernet connectors, and/or wireless communication circuitry, such as 5G circuitry and one or more antennas. Interface 336 receives content from external server 214 (as shown in FIG. 2) by known methods, non-limiting examples of which include terrestrial antenna, satellite dish, wired cable, DSL, optical fibers, or 5G as discussed above. Through interface 336, gateway device 210 receives an input signal, including data and/or audio/video content, from external server 214 and can send data to external server 214.

For example, returning to FIG. 2, presume that user 204 uses client device 205 to attempt to contact client device 203, associated with user 202. This may be performed by any known method, a non-limiting example of which includes by way of cellular network 218. Further, for purposed of discussion let user 202 fail to answer the communication attempt, shown as failed communication attempt 215. With reference to FIG. 3, controller 301 of client device 205 may execute instructions stored on memory 302, which causes radio 304 to transmit failed communication alert 225 to radio 314 of RTC server 220 through notification alert channel 235 via communication channels 230, 226, and 232.

Returning to FIG. 1, after the RTC server receives a failed communication alert (S108), the media device is identified (S110). For example, with reference to FIGS. 2 and 3, controller 311 may execute instructions stored on memory 312, which causes RTC server 220 to analyze failed communication alert 225 sent from client device 205. As client device 205 was attempting to contact client device 203, which is associated with media device 208, RTC server 220 may determine that failed communication alert 225 must be forwarded to media device 208.

Returning to FIG. 1, after the media device is identified (S110), the RTC server transmits a notification instruction (S112). For example, as shown in FIG. 3, after RTC server 220 determines that media device 208 is to receive failed communication alert 225, controller 311 may execute instructions stored on memory 312, which causes interface 316 to transmit failed communication alert 225 to interface 326 of external server 214 through notification alert channel 235 via communication channels 232 and 224. Then, controller 321 may execute instructions stored on memory 322, which causes interface 326 of external server 214 to transmit failed communication alert 225 to interface 336 of gateway device 210 through notification alert channel 235 via communication channel 222. Similarly, gateway device 210 may transmit failed communication alert 225 to media device 208 via radio 334.

In some embodiments, RTC server 220 and external server 214 may be a unitary device. As such, failed communication alert 225 may be transmitted to gateway device 210 immediately through the unitary device, instead of going through RTC server 220 and then external server 214, as shown by dotted arrow 233.

Returning to FIG. 1, after the RTC server transmits a notification instruction (S112), the media device provides the notification (S114). For example, returning to FIG. 2, media device 208 may receive failed communication alert 225. Media device 208 may then transmit notification 229 to display 212. Notification 229 may then instruct display 212 to provide user 202 with a notification of the failed communication attempt by user 204. A non-limiting example of a notification includes a pop-up message on the screen of display 212 reading, "Missed call from user 204." User 202, who is watching content on display 212, may observe the notification indicating a missed call from user 204.

In some embodiments, display 212 may also provide an auditory notification if there is a speaker component.

Returning to FIG. 1, after the media device provides the notification (S114), algorithm 100 stops (S116).

In some embodiments, a notification may be sent back to the publisher indicating that the failed communication alert was delivered to the subscriber. This process may be completed by known acknowledgement (ACK) processes. For example, presume that notification 229 was successfully displayed on display 212 for user 202 to see. An ACK may then be sent back to the publisher, client device 205, indicating that failed communication alert 225 was successfully delivered to media device 208, and subsequently user 202 was notified of the failed communication attempt via notification 229. Still further, in some o embodiments, a notification may only be sent back to the publisher if the failed communication alert was not delivered to the subscriber. This process may be completed by known negative acknowledgement (NACK) processes.

In the above-discussed, non-limiting embodiments, client device 205 of user 204 (or client device 207 of user 206) sends the failed communication alert based on a failed communication attempt with client device 203. However, in some embodiments, client device 203 may be configured to send a failed communication alert based on a failed communication attempt from client device 205 of user 204 (or client device 207 of user 206). This will be discussed in greater detail with reference to FIG. 4.

Figure 4:
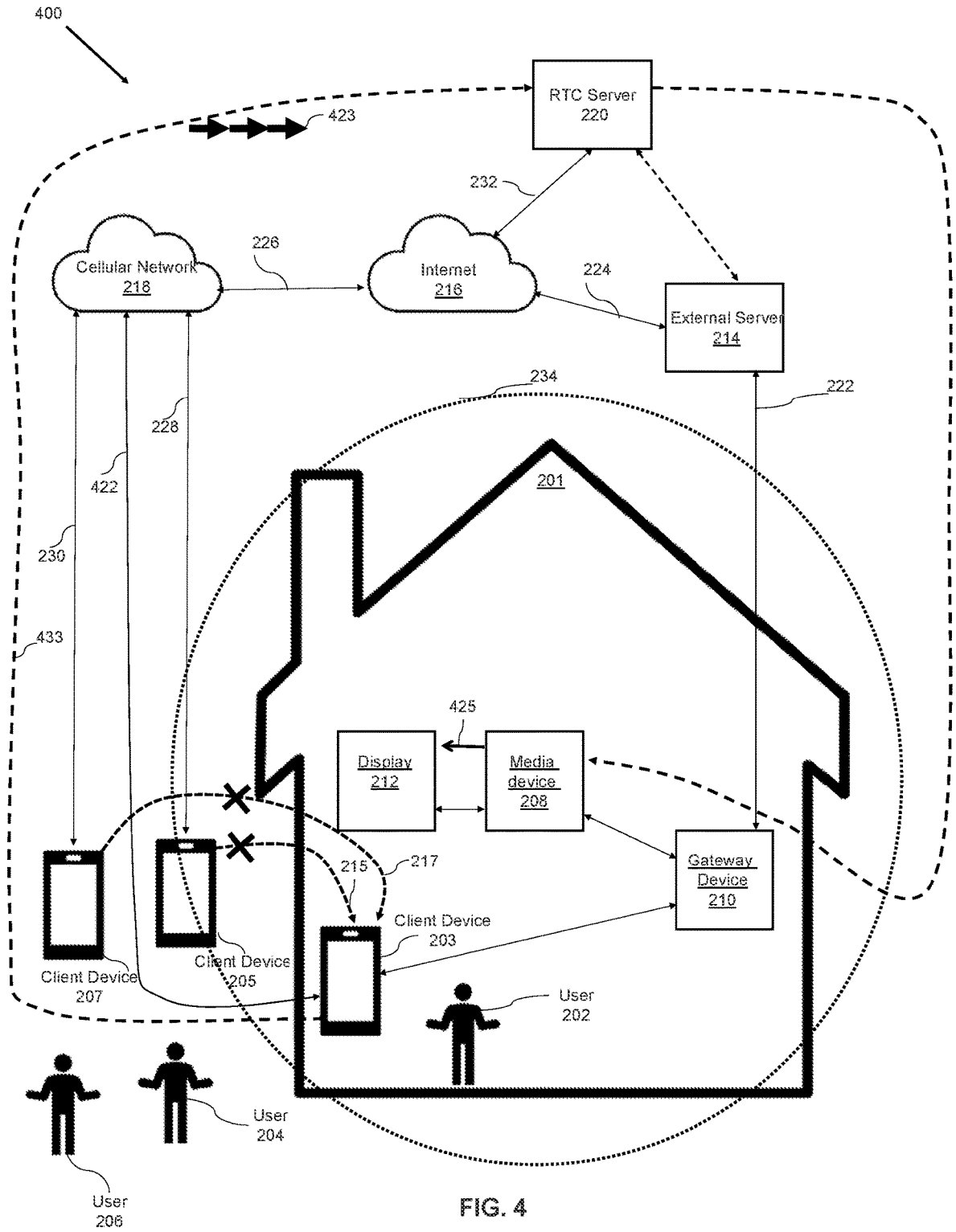
FIG. 4 illustrates a communication network in accordance with aspects of the present disclosure.

FIG. 4 illustrates a communication network 400 in accordance with aspects of the present disclosure.

As shown in FIG. 4, communication network 400 includes residence 201, user 202, client device 203, user 204, client device 205, user 206, client device 207, media device 208, gateway device 210, display 212, external server 214, internet 216, failed communication attempts 215 and 217, cellular network 218, RTC server 220, communication channels 222, 224, 226, 228, 230, 232 and 422, a failed communication alert 423, a notification 425, and a notification alert channel 433.

For example, with reference to FIG. 4, presume that user 206, using client device 207, attempts to initiate contact with user 202 by calling client device 203. User 202 fails to answer the incoming phone call on client device 203. Client device 203 may then automatically transmit failed communication alert 423 to RTC server 220 through notification alert channel 433 via communication channel 422, cellular network 218, communication channel 226, internet 216, and communication channel 232. RTC server 220 may then transmit failed communication alert 423 to media device 208 in a manner similar to that discussed above with reference to FIG. 2.

In accordance with aspects of the present invention, a person outside of the home may attempt to call a person inside a home. If there is no response because the person inside the home does not answer the phone call, i.e., a failed communication, then at least one of the phone of the person outside the home and the phone of the person inside the home may initiate the failed communication alert. In particular, as discussed above with reference to FIG. 2, the phone, i.e., client device 205 of the person outside the home, i.e., user 204 initiated the failed communication alert. On the other hand, as discussed above with reference to FIG. 4, the phone, i.e., client device 203 of the person inside the home, i.e., user 202, initiated the failed communication alert.

In some embodiments, residence 201 may have multiple publishers and subscribers. This will be described in greater detail with reference to FIG. 5.

Figure 5:
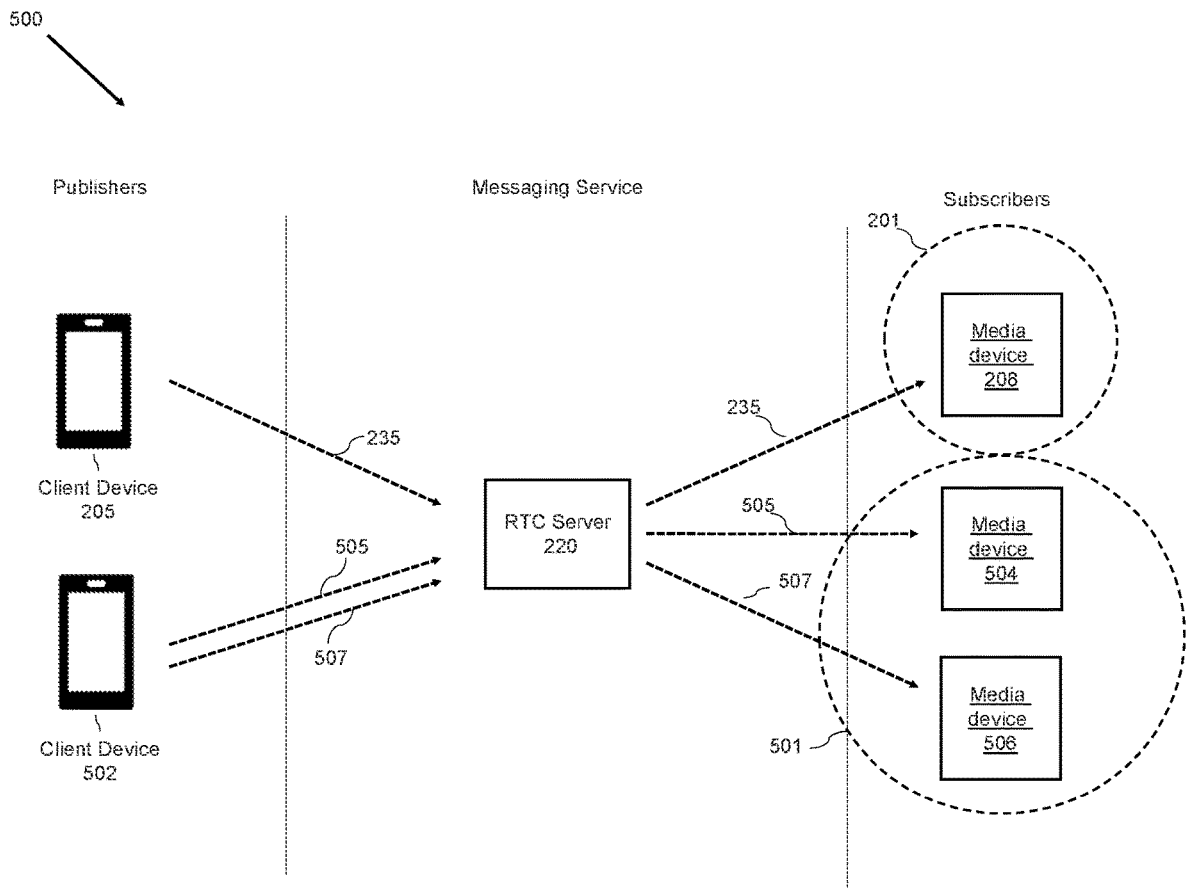
FIG. 5 illustrates a sample embodiment of publishers and subscribers in accordance with aspects of the present disclosure.

FIG. 5 illustrates a sample embodiment of publishers and subscribers 500 in accordance with aspects of the present disclosure.

As shown in FIG. 5, a sample embodiment of publishers and subscribers 500 includes residence 201, client device 205, RTC server 220, media device 208, notification alert channel 235, a residence 501, a client device 502, media device 504 and 506, and a notification alert channel 505 and 507.

Client device 502 operates in a manner similar to that of client device 205. Media devices 504 and 506 operate in a manner similar to that of media device 208. Residence 501 may have components and devices similar to that of residence 201. Publishers include client devices 205 and 502, and subscribers include media devices 208, 504, and 506. RTC server 220 is able to manage multiple households, shown as residences 201 and 501.

As shown in FIGS. 2 and 4, media device 208 is the lone subscriber of residence 201, and is associated with two publishers, client devices 205 and 207. However, as shown in FIG. 5, a residence may also have multiple subscribers, such as residence 501 having media devices 504 and 506. While there can be multiple publishers and subscribers in a single household, each publisher has a unique notification alert channel connecting it with a subscriber. While client device 502 is associated with both media device 504 and 506, there are two distinct notification alert channels, shown in FIG. 5 as notification alert channels 505 and 507 respectively.

It is commonplace for people to miss phone calls or messages, but this can become an issue when the missed message is urgent. People are more likely to miss communication attempts if they are consuming media on some display device or speaker. Elderly people and children are most susceptible to missing messages if they are not using their cell phones or mobile devices. There needs to be a way to alert people of their missed messages immediately after missing them.

In accordance with the present disclosure, a user may register a media device and a client device with an RTC server. A second user may register with the media device using a second client device, creating a channel with the second client device and the media device. If the second user attempts to initiate contact with the first user but fails, the second client device may automatically send a failed notification alert to the RTC server through known real-time communication protocol. Real-time communication is any mode of telecommunication in which information is instantly transmitted without delays. The RTC server may analyze the failed notification alert and relay it to the corresponding media device. The media device may analyze the failed notification alert and display it on its connected display device. In some embodiments, once the second user attempts to initiate contact with the first user but fails, the first user's client device may send the failed notification alert to the RTC server.

Thus, the present disclosure as disclosed displays a visual or auditory message to users while they are consuming media, alerting them of any missed phone calls or messages.

The operations disclosed herein may constitute algorithms that can be effected by software, applications (apps, or mobile apps), or computer programs. The software, applications, computer programs can be stored on a non-transitory computer-readable medium for causing a computer, such as one with one or more processors, to execute the operations described herein and shown in the drawing figures.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed is:

1. A server device for use with a first user, a first client device, a second user, a second client device, and a media device, the first client device being associated with the first user and being configured to attempt to initiate communication with the second client device, one of the first client device and the second client device being configured to transmit an alert based on a failed attempt to initiate communication between the first client device and the second client device, the second client device being associated with the second user, the media device being configured to provide media to the user, said server device comprising:
   a memory having a data structure and instructions stored therein; and
   a processor configured to execute the instructions stored on said memory to cause said server device to:
   create a channel for the media device;
   associate, with the channel, the one of the first client device and the second client device configured to transmit the alert, wherein the one of the first client device and the second client device is registered as a publisher to the media device;
   receive the alert through the channel;
   identify the media device based on the alert; and
   transmit, based on the alert, a notification instruction to the media device to instruct the media device to provide a notification to the second user of the failed attempt to initiate communication.

2. The server device of claim 1, wherein the first client device is configured to transmit the alert, and
   wherein said processor is further configured to execute the instructions stored on said memory to additionally cause said server device to receive the alert from the first client device.

3. The server device of claim 1, wherein the second client device is configured to transmit the alert, and
   wherein said processor is further configured to execute the instructions stored on said memory to additionally cause said server device to receive the alert from the second client device.

4. The server device of claim 1, wherein said processor is further configured to execute the instructions stored on said memory to additionally cause said server device to receive the alert as a real time communication protocol.

5. The server device of claim 4, for further use with a third user and a third client device, one of the third client device and the second client device being configured to transmit a second alert based on a second failed attempt to initiate communication between the third client device and the second client device, the third client device being associated with the third user,
   wherein said processor is further configured to execute the instructions stored on said memory to additionally cause said server device to
   create a second channel for the media device;
   associate, with the second channel, one of the third client device and the second client device configured to transmit the second alert;
   receive the second alert;
   identify the media device based on the second alert; and
   transmit, based on the alert, a second notification instruction to the media device to instruct the media device to provide a second notification to the second user of the second failed attempt to initiate communication.

6. A method of using a server device with a first user, a first client device, a second user, a second client device, and a media device, the first client device being associated with the first user and being configured to attempt to initiate communication with the second client device, one of the first client device and the second client device being configured to transmit an alert based on a failed attempt to initiate communication between the first client device and the second client device, the second client device being associated with the second user, the media device being configured to provide media to the user, said method comprising:
   creating, via a processor and into a memory having a data structure and instructions therein, a channel for the media device;
   associating, via the processor, the one of the first client device and the second client device configured to transmit the alert, wherein the one of the first client device and the second client device is registered as a publisher to the media device;
   receiving, via the processor, the alert through the channel;
   identifying, via the processor, the media device based on the alert; and
   transmitting, via the processor and based on the alert, a notification instruction to the media device to instruct the media device to provide a notification to the second user of the failed attempt to initiate communication.

7. The method of claim 6, wherein the first client device is configured to transmit the alert, further comprising, receiving, via the processor, the alert from the first client device.

8. The method of claim 6, wherein the second client device is configured to transmit the alert, further comprising, receiving, via the processor, the alert from the second client device.

9. The method of claim 6, wherein said receiving, via the processor, the alert comprises receiving the alert as a real time communication protocol.

10. The method of claim 9, the server device being for further use with a third user and a third client device, one of the third client device and the second client device being configured to transmit a second alert based on a second failed attempt to initiate communication between the third client device and the second client device, the third client device being associated with the third user, said method further comprising:

creating, via the processor, a second channel for the media device;

associating, via the processor and with the second channel, the one of the third client device and the second client device configured to transmit the second alert;

receiving, via the processor, the second alert;

identifying, via the processor, the media device based on the second alert; and transmitting, via the processor and based on the alert, a second notification instruction to the media device to instruct the media device to provide a second notification to the second user of the second failed attempt to initiate communication.

11. A non-transitory, computer-readable media having computer-readable instructions stored thereon, the computer-readable instructions being capable of being read by a server device for use with a first user, a first client device, a second user, a second client device, and a media device, the first client device being associated with the first user and being configured to attempt to initiate communication with the second client device, one of the first client device and the second client device being configured to transmit an alert based on a failed attempt to initiate communication between the first client device and the second client device, the second client device being associated with the second user, the media device being configured to provide media to the user, wherein the computer-readable instructions are capable of instructing the server device to perform the method comprising:

creating, via a processor and into a memory having a data structure and instructions therein, a channel for the media device;

associating, via the processor, the one of the first client device and the second client device configured to transmit the alert, wherein the one of the first client device and the second client device is registered as a publisher to the media device;

receiving, via the processor, the alert through the channel;

identifying, via the processor, the media device based on the alert; and transmitting, via the processor and based on the alert, a notification instruction to the media device to instruct the media device to provide a notification to the second user of the failed attempt to initiate communication.

12. The non-transitory, computer-readable media of claim 11, wherein the computer-readable instructions are capable of instructing the server device to perform the method wherein the first client device is configured to transmit the alert, further comprising, receiving, via the processor, the alert from the first client device.

13. The non-transitory, computer-readable media of claim 11, wherein the computer-readable instructions are capable of instructing the server device to perform the method wherein the second client device is configured to transmit the alert, further comprising, receiving, via the processor, the alert from the second client device.

14. The non-transitory, computer-readable media of claim 11, wherein the computer-readable instructions are capable of instructing the server device to perform the method wherein said receiving, via the processor, the alert comprises receiving the alert as a real time communication protocol.

15. The non-transitory, computer-readable media of claim 14, the server device being for further use with a third user and a third client device, one of the third client device and the second client device being configured to transmit a second alert based a second failed attempt to initiate communication between the third client device and the second client device, the third client device being associated with the third user, wherein the computer-readable instructions are capable of instructing the server device to perform the method further comprising:

creating, via the processor, a second channel for the media device;

associating, via the processor and with the second channel, the one of the third client device and the second client device configured to transmit the second alert;

receiving, via the processor, the second alert;

identifying, via the processor, the media device based on the second alert; and transmitting, via the processor and based on the alert, a second notification instruction to the media device to instruct the media device to provide a second notification to the second user of the second failed attempt to initiate communication.

\* \* \* \* \*